US012670321B2

(12) United States Patent
Wei et al.

(10) Patent No.: US 12,670,321 B2
(45) Date of Patent: Jun. 30, 2026

(54) QUANTIZATION METHOD AND APPARATUS FOR TEXT FEATURE EXTRACTION MODEL, AND DEVICE AND STORAGE MEDIUM

(71) Applicant: BEIJING YOUZHUJU NETWORK TECHNOLOGY CO., LTD., Beijing (CN)

(72) Inventors: Yang Wei, Beijing (CN); Ying Xiong, Beijing (CN); Xiaohui Wang, Beijing (CN); Mingxuan Wang, Beijing (CN); Lei Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 339 days.

(21) Appl. No.: 18/259,210

(22) PCT Filed: Dec. 10, 2021

(86) PCT No.: PCT/CN2021/136981
§ 371 (c)(1),
(2) Date: Jun. 23, 2023

(87) PCT Pub. No.: WO2022/135174
PCT Pub. Date: Jun. 30, 2022

(65) Prior Publication Data
US 2024/0296283 A1 Sep. 5, 2024

(30) Foreign Application Priority Data
Dec. 24, 2020 (CN) .......................... 202011552423.6

(51) Int. Cl.
*G06F 40/279* (2020.01)
*G06F 18/213* (2023.01)

(52) U.S. Cl.
CPC .......... *G06F 40/279* (2020.01); *G06F 18/213* (2023.01)

(58) Field of Classification Search
None
See application file for complete search history.

(56) References Cited

U.S. PATENT DOCUMENTS

2019/0012559 A1* 1/2019 Desappan ............ G06V 10/764
2019/0340492 A1 11/2019 Burger et al.

FOREIGN PATENT DOCUMENTS

CN        109543821 A    3/2019
CN        110276451 A    9/2019
(Continued)

OTHER PUBLICATIONS

Dalskov et al. "Secure Evaluation of Quantized Neural Networks", arXiv:1910.12435v1, Oct. 29, 2019 (Year: 2019).*
(Continued)

*Primary Examiner* — Nicole A K Schmieder

(57) ABSTRACT

A quantization method and apparatus for a text feature extraction model, and a device and a storage medium. The method includes: in a training process of a text feature extraction model, determining, according to a target quantization parameter, a quantization interval corresponding to the target quantization parameter, where the quantization interval includes a part of floating-point values of the target quantization parameter; constructing a mapping relationship between floating-point values and fixed-point values of the target quantization parameter based on the quantization interval, where a floating-point value smaller than a left end point of the quantization interval—is mapped to a quantized minimum fixed-point value, and a floating-point values larger than a right end point of the quantization interval is mapped to a quantized maximum fixed-point value; and
(Continued)

performing a quantization operation on the target quantization parameter based on the mapping relationship.

16 Claims, 7 Drawing Sheets

(56)                    References Cited

FOREIGN PATENT DOCUMENTS

| | | |
|---|---|---|
| CN | 110610237 A | 12/2019 |
| CN | 110929838 A | 3/2020 |
| CN | 111738419 A | 10/2020 |
| CN | 111814448 A | 10/2020 |
| CN | 112686031 A | 4/2021 |

OTHER PUBLICATIONS

International Search Report issued Mar. 9, 2022 in International Application No. PCT/CN2021/136981, with English translation (6 pages).
Written Opinion for International Application No. PCT/CN2021/136981, mailed Mar. 9, 2022, 9 Pages.

\* cited by examiner

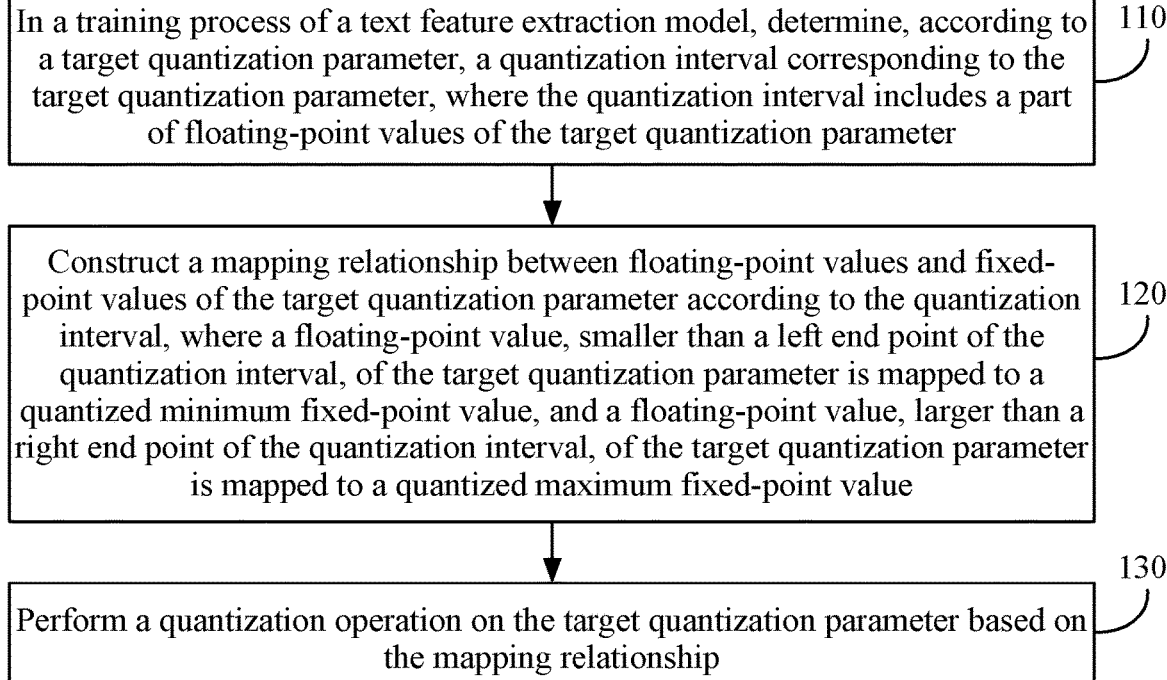

| In a training process of a text feature extraction model, determine, according to a target quantization parameter, a quantization interval corresponding to the target quantization parameter, where the quantization interval includes a part of floating-point values of the target quantization parameter | 110 |

| Construct a mapping relationship between floating-point values and fixed-point values of the target quantization parameter according to the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value | 120 |

| Perform a quantization operation on the target quantization parameter based on the mapping relationship | 130 |

FIG. 1

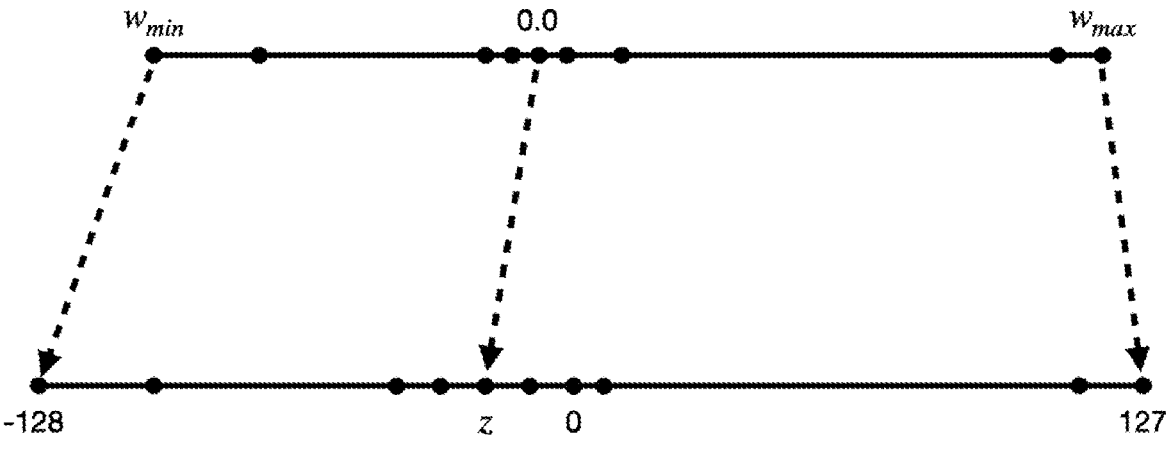

FIG. 2

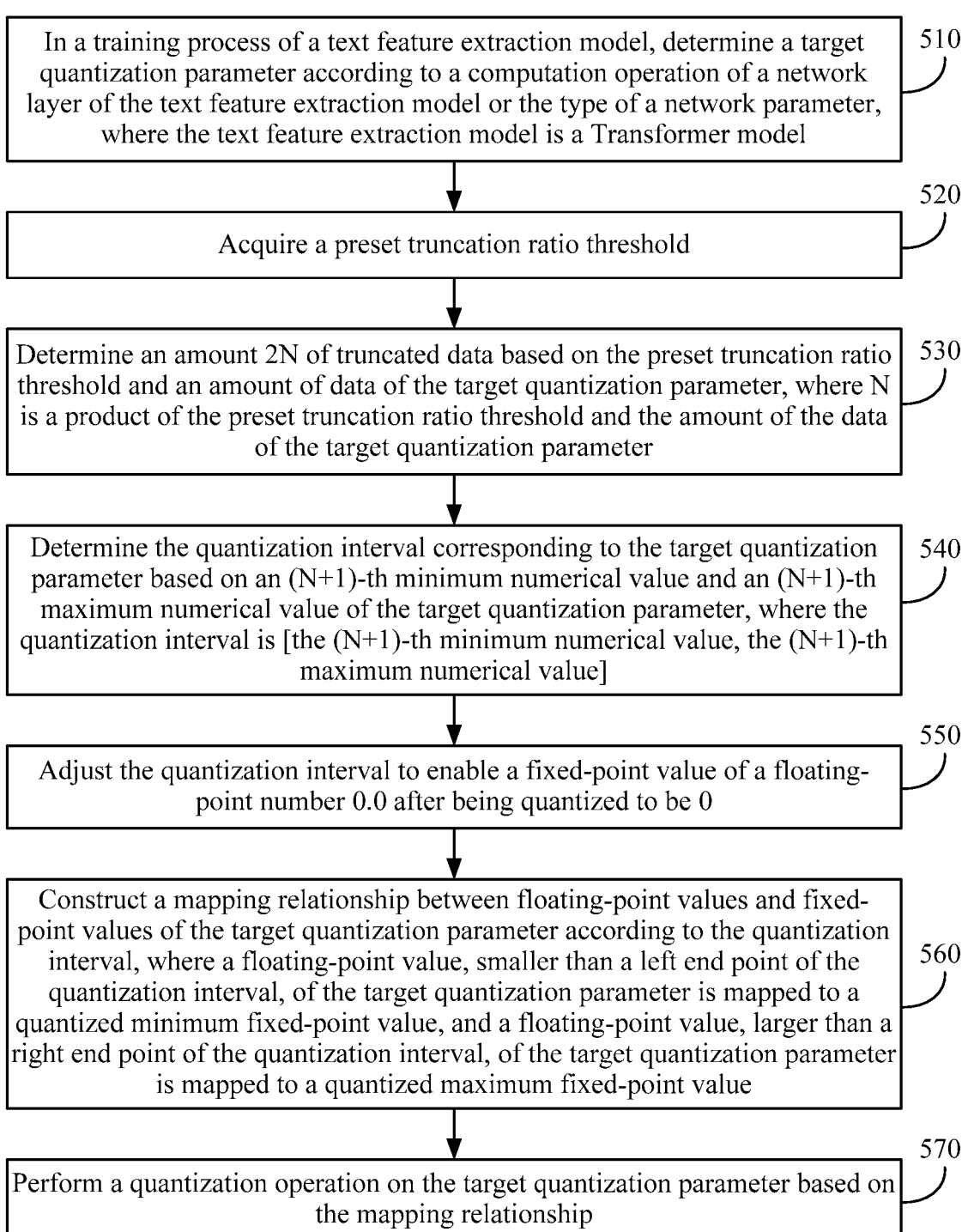

In a training process of a text feature extraction model, determine a target quantization parameter according to a computation operation of a network layer of the text feature extraction model or the type of a network parameter, where the text feature extraction model is a Transformer model — 510

Acquire a preset truncation ratio threshold — 520

Determine an amount 2N of truncated data based on the preset truncation ratio threshold and an amount of data of the target quantization parameter, where N is a product of the preset truncation ratio threshold and the amount of the data of the target quantization parameter — 530

Determine the quantization interval corresponding to the target quantization parameter based on an (N+1)-th minimum numerical value and an (N+1)-th maximum numerical value of the target quantization parameter, where the quantization interval is [the (N+1)-th minimum numerical value, the (N+1)-th maximum numerical value] — 540

Adjust the quantization interval to enable a fixed-point value of a floating-point number 0.0 after being quantized to be 0 — 550

Construct a mapping relationship between floating-point values and fixed-point values of the target quantization parameter according to the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value — 560

Perform a quantization operation on the target quantization parameter based on the mapping relationship — 570

FIG. 5

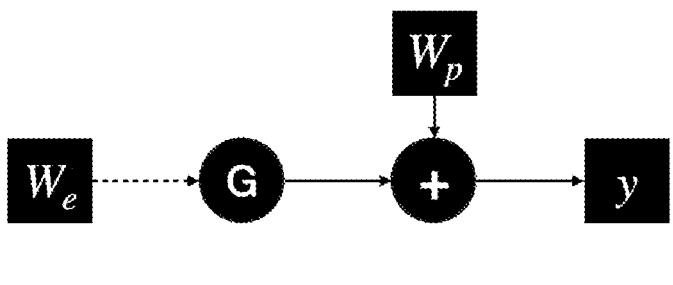
FIG. 6
FIG. 7
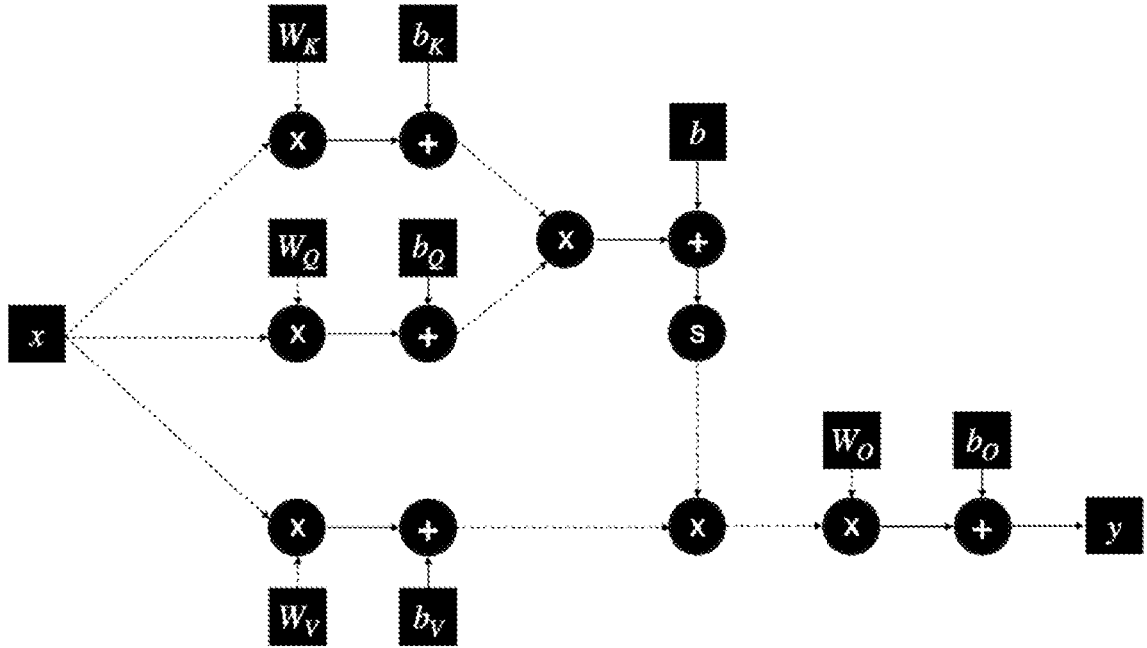
FIG. 8

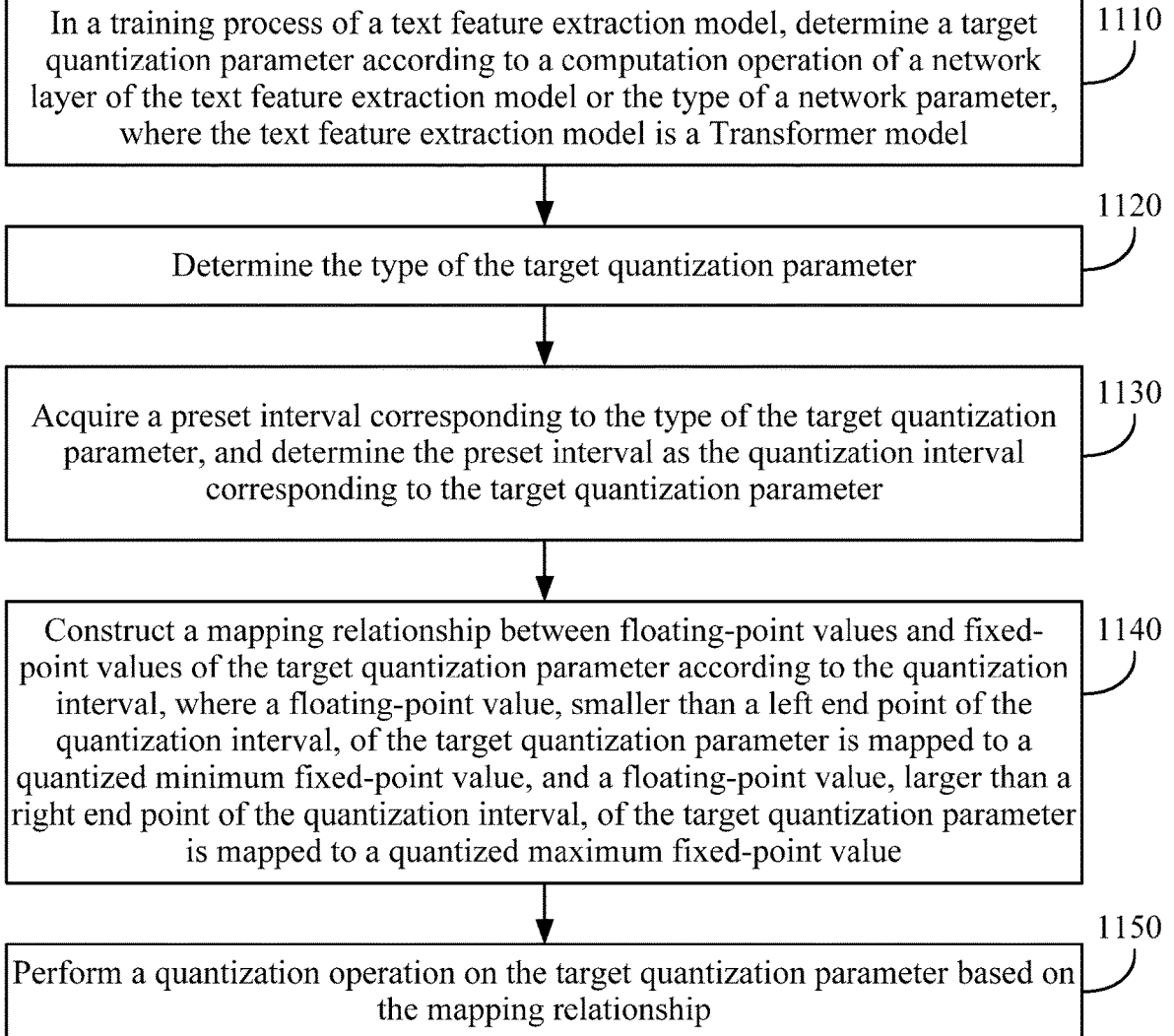

In a training process of a text feature extraction model, determine a target quantization parameter according to a computation operation of a network layer of the text feature extraction model or the type of a network parameter, where the text feature extraction model is a Transformer model    1110

Determine the type of the target quantization parameter    1120

Acquire a preset interval corresponding to the type of the target quantization parameter, and determine the preset interval as the quantization interval corresponding to the target quantization parameter    1130

Construct a mapping relationship between floating-point values and fixed-point values of the target quantization parameter according to the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value    1140

Perform a quantization operation on the target quantization parameter based on the mapping relationship    1150

FIG. 11

QUANTIZATION METHOD AND APPARATUS FOR TEXT FEATURE EXTRACTION MODEL, AND DEVICE AND STORAGE MEDIUM

CROSS-REFERENCE TO RELATED APPLICATIONS

This is a national stage application filed under 37 U.S.C. 371 based on International Patent Application No. PCT/CN2021/136981, filed Dec. 10, 2021, which claims priority to Chinese Patent Application No. 202011552423.6, filed with the China National Intellectual Property Administration (CNIPA) on Dec. 24, 2020, the disclosures of which are incorporated herein by reference in their entireties.

TECHNICAL FIELD

The present disclosure relates to the field of computer technology, for example, to a quantization method for a text feature extraction model, a quantization apparatus for a text feature extraction model, a device and a storage medium.

BACKGROUND

In natural language processing, text feature extraction models have been more and more widely used. More popular text feature extraction models are the Transformer model and various variant models of the Transformer model. These models have achieved good effects on a variety of natural language processing tasks. However, the text feature extraction model has a large number of model parameters and requires a large amount of calculation, and is limited by storage and computing capabilities of the computer, which causes significant issues with the fast inference of the text feature extraction model and the deployment of the text feature extraction model on the mobile terminal.

To address these issues, the most direct solution is to quantize the text feature extraction model, that is, convert the model represented by high-precision floating-point numbers to a model represented with low-precision means, for example, converting a model represented by 32-bit floating-point numbers to a model represented by 8-bit integers. In this way, the number of parameters and physical volume of the model are directly reduced to ¼ of the original ones, and the inference speed is greatly accelerated on terminals lacking a graphics processing unit (GPU) such as mobile terminals, and the effect is immediate. However, after quantizing the text feature extraction model, the accuracy of the text feature extraction model may be sharply reduced.

SUMMARY

A quantization method for a text feature extraction model, a quantization apparatus for a text feature extraction model, a device and a storage medium are provided according to the present disclosure, which can effectively improve the accuracy of the text feature extraction model while ensuring the improvement of the operating speed of the text feature extraction model.

A quantization method for a text feature extraction model is provided and includes the steps described below.

In a training process of the text feature extraction model, a quantization interval corresponding to a target quantization parameter is determined according to the target quantization parameter, where the quantization interval includes a part of floating-point values of the target quantization parameter.

A mapping relationship between floating-point values of the target quantization parameter and fixed-point values of the target quantization parameter is constructed according to the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value.

A quantization operation is performed on the target quantization parameter based on the mapping relationship.

A quantization apparatus for a text feature extraction model is further provided and includes a quantization interval determination module, a mapping relationship construction module and a quantization module.

The quantization interval determination module is configured to determine, according to a target quantization parameter, a quantization interval corresponding to the target quantization parameter in a training process of the text feature extraction model, where the quantization interval includes a part of floating-point values of the target quantization parameter.

The mapping relationship construction module is configured to construct a mapping relationship between floating-point values and fixed-point values of the target quantization parameter according to the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value.

A quantization module is configured to perform a quantization operation on the target quantization parameter based on the mapping relationship.

An electronic device is further provided.

The electronic device includes at least one processing apparatus and a storage apparatus.

The storage apparatus is configured to store at least one program.

The at least one program, when executed by the at least one processing apparatus, causes the at least one processing apparatus to implement the quantization method for a text feature extraction model as described in the embodiments of the present disclosure.

A computer-readable medium storing a computer program is further provided. The computer program, when executed by a processing apparatus, implements the quantization method for a text feature extraction model as described in the embodiments of the present disclosure.

BRIEF DESCRIPTION OF DRAWINGS

FIG. 1 is a flowchart of a quantization method for a text feature extraction model according to an embodiment of the present disclosure;

FIG. 2 is a diagram of a quantization principle for a text feature extraction model;

FIG. 5 is a flowchart of a quantization method for a text feature extraction model according to another embodiment of the present disclosure;

FIG. 6 is a structural diagram of a word vector input network of a text feature extraction model according to an embodiment of the present disclosure;

FIG. 7 is a structural diagram of an overall network of a text feature extraction model according to an embodiment of the present disclosure;

FIG. 8 is a structural diagram of a network of an attention layer in a text feature extraction model according to an embodiment of the present disclosure;

FIG. 11 is a flowchart of a quantization method for a text feature extraction model according to an embodiment of the present disclosure;

DETAILED DESCRIPTION

Figure 3:
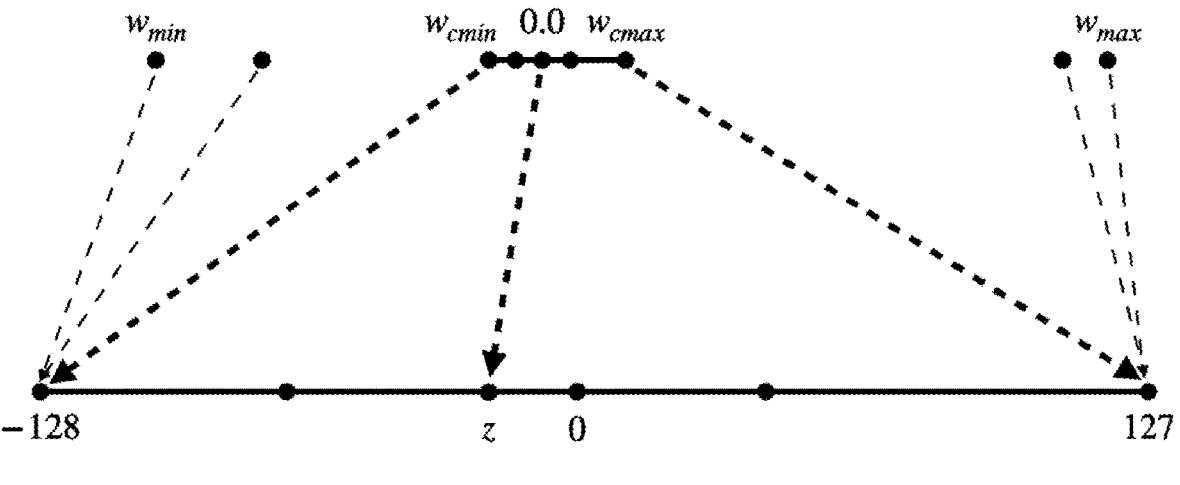
FIG. 3 is a diagram of a quantization principle for a text feature extraction model according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided in order for the present disclosure to be thoroughly and completely understood. It should be understood that drawings and embodiments of the present disclosure are merely illustrative and are not intended to limit the scope of the present disclosure.

It is to be understood that the various steps set forth in the method embodiments of the present disclosure may be performed in a different order, and/or in parallel. In addition, the method embodiments may include additional steps and/or omit to perform the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least another embodiment"; and the term "some embodiments" means "at least some embodiments". Related definitions of other terms are given in the description hereinafter.

It is to be noted that references to "first", "second" and the like in the present disclosure are merely intended to distinguish one from another apparatus, module, or unit and are not intended to define the order or interrelationship of the functions performed by these apparatuses, modules, or units.

It is to be noted that references to modifications of "one" or "more/a plurality of/multiple" mentioned in the present disclosure are intended to be illustrative rather than limiting; the person skilled in the art should understand that "one" or "more/a plurality of/multiple" should be understood as "one or more" unless clearly indicated in the context.

The names of messages or information exchanged between multiple apparatuses in embodiments of the present disclosure are only for illustrative purposes rather than being intended to limit the scope of such messages or information.

FIG. 1 is a flowchart of a quantization method for a text feature extraction model according to an embodiment of the present disclosure. The embodiment of the present disclosure is applicable to the case of quantizing a text feature extraction model, and the method can be implemented by a quantization apparatus for a text feature extraction model, the apparatus can be composed of hardware and/or software, and can be integrated into a device with the function of quantization for a text feature extraction model. This device can be an electronic device such as a server, a mobile terminal or a server cluster. As shown in FIG. 1, the method includes the following steps 110, 120 and 130.

In step 110, in a training process of a text feature extraction model, a quantization interval corresponding to a target quantization parameter is determined according to the target quantization parameter, where the quantization interval includes a part of floating-point values of the target quantization parameter.

In the embodiment of the present disclosure, the text feature extraction model may include a machine learning model such as a neural network model or a Naive Bayes model, or may be a Transformer model or a variant model of the Transformer model such as a model of bidirectional encoder representations from Transformers (BERT) or a generative pre-training (GPT) model. The embodiment of the present disclosure does not limit which machine learning model the text feature extraction model is embodied as.

In the embodiment of the present disclosure, the target quantization parameter may be understood as a target parameter to be quantized in the training process of the text feature extraction model, where the target quantization parameter may be a network parameter of the text feature extraction model, or may be an intermediate quantity of an input or output of a network layer in the text feature extraction model, or may be a computation operation object involved before or after a computation operation performed by a network layer in the text feature extraction model. The quantization interval is an interval obtained by taking a part of floating-point values of the target quantization parameter, that is, the part of the floating-point values of the target quantization parameter is within the quantization interval, and another part of the floating-point values of the target quantization parameter is outside the quantization interval.

In the training process of the text feature extraction model, the quantization interval corresponding to the target quantization parameter is determined according to the target quantization parameter, and quantization intervals corresponding to different target quantization parameters are different. Exemplarily, the quantization interval corresponding to the target quantization parameter may be determined based on distribution characteristics of numerical values of the target quantization parameter, or the quantization interval corresponding to the target quantization parameter may be determined according to the type of the target quantization parameter. The manner of determining the quantization interval corresponding to the target quantization parameter is not limited in the embodiments of the present disclosure.

In step 120, a mapping relationship between floating-point values of the target quantization parameter and fixed-point values of the target quantization parameter is constructed according to the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value.

Exemplarily, quantizing floating-point numbers into 8-bit integers is taken as an example, FIG. 2 is a diagram of a quantization principle for a text feature extraction model. As shown in FIG. 2, circular solid points in an interval [$w_{min}$, $w_{max}$] represent floating-point values of a target quantization parameter before being quantized, where $w_{min}$ in is the minimum numerical value in the floating-point values of the target quantization parameter, $w_{max}$ is the maximum numerical value in the floating-point values of the target quantization parameter, and the interval [$w_{min}$, $w_{max}$] includes all the floating-point values of the target quantization parameter; and circular solid points in an interval of [−128, 127] represent fixed-point integers of the target quantization parameter after being quantized. According to FIG. 2, it can be seen that in the quantization method for the text feature extraction model, a floating-point value range [$w_{min}$, $w_{max}$] of the parameter before the quantization is first solved, and then the interval [$w_{min}$, $w_{max}$] is mapped to the integer interval [−128, 127] in proportion. Therefore, the integer value z of the floating-point value 0.0 after being mapped is not necessarily equal to the integer 0. Moreover, most of the floating-point values before the quantization are distributed near the value 0.0, and only few of the floating-point values are within a relatively abnormal range. If the floating-point values are mapped directly according to the interval [$w_{min}$, $w_{max}$], most of fixed-point values (integer values) obtained after the quantization are also distributed near the value 0, resulting in that many floating-point values are mapped to the same integer value, a large difference of de-quantized floating-point values from the original floating-point values before the quantization, and thus the quantized text feature extraction model has a poor accuracy.

In the embodiment of the present disclosure, the mapping relationship between the floating-point values and the fixed-point values of the target quantization parameter is constructed according to the quantization interval determined in the step 110. Quantizing floating-point numbers into 8-bit integers is taken as an example for illustration. FIG. 3 is a diagram of a quantization principle for a text feature extraction model according to an embodiment of the present disclosure. As shown in FIG. 3, the quantization interval determined based on the step 110 is [$w_{cmin}$, $w_{cmax}$], where the quantization interval [$w_{cmin}$, $w_{cmax}$] may be obtained by taking a part of the floating-point values of the target quantization parameter; and even if another part of the floating-point values of the target quantization parameter are outside the quantization interval [$w_{Cmin}$, $w_{cmax}$], as long as most of the floating-point values of the target quantization parameter are within the quantization interval [$w_{cmin}$, $w_{cmax}$]. Exemplarily, the floating-point values of the target quantization parameter in the quantization interval [$w_{cmin}$, $w_{cmax}$] may be proportionally mapped to the fixed-point value interval [−128, 127], floating-point values, smaller than a left end point $w_{cmin}$ of the quantization interval, of the target quantization parameter are uniformly mapped to an integer fixed-point value −128, and floating-point values, larger than a right end point $w_{cmax}$ of the quantization interval, of the target quantization parameter are uniformly mapped to an integer fixed-point value 127, thereby completing the operation of constructing the mapping relationship between the floating-point values and the fixed-point values of the target quantization parameter based on the quantization interval. It can be seen from FIG. 3 that with the quantization method for the text feature extraction model according to the embodiment of the present disclosure, quantized target quantization parameters can be distributed more uniformly, and will not be concentrated near the integer 0, and the floating-point values (the floating-point values truncated to be excluded from the quantization interval of the target quantization parameter) of the target quantization parameter outside the quantization interval, due to their extremely small proportion, have nearly no impact on the accuracy of the text feature extraction model.

Exemplarily, quantizing a 32-bit floating-point number q into an 8-bit integer i is taken as an example, the mapping relationship between the floating-point values and the fixed-point values of the target quantization parameter may be constructed through an algorithm i=q/s+z, where s indicates the quantization parameter, z indicates an integer value corresponding to the floating-point number 0.0 after being quantized, and the floating-point number q is located within the quantization interval.

In step 130, a quantization operation is performed on the target quantization parameter based on the mapping relationship.

In the embodiment of the present disclosure, in the training process of the text feature extraction model, the quantization operation is performed on the target quantization parameter based on the mapping relationship between the floating-point values and the fixed-point values of the target quantization parameter, and in the process of quantizing the target quantization parameter, the quantization parameter is determined, where, in each time of iterative training of the text feature extraction model, the quantization parameter is determined once until the accuracy loss of the quantized text feature extraction model reaches the minimum, or even 0. Therefore, through multiple times of iterative training of quantization for the text feature extraction model, the quantization for the text feature extraction model is completed.

In the scheme according to the embodiment of the present disclosure, in the training process of the text feature extraction model, a quantization interval corresponding to a target quantization parameter is determined according to the target quantization parameter, where the quantization interval includes a part of floating-point values of the target quantization parameter; a mapping relationship between floating-point values and fixed-point values of the target quantization parameter is constructed based on the quantization interval, where floating-point values, smaller than a left end point of the quantization interval, of the target quantization parameter are mapped to a quantized minimum fixed-point value, and floating-point values, larger than a right end point of the quantization interval, of the target quantization parameter are mapped to a quantized maximum fixed-point value; and a quantization operation is performed on the target quantization parameter based on the mapping relationship. The quantization method for a text feature extraction model according to the embodiment of the present disclosure can adaptively and dynamically select the quantization interval according to the numerical value distribution of the target quantization parameter to construct the mapping relationship between numerical values of the quantization parameter before and after the quantization based on the quantization interval, so as to quantize the target quantization parameter in the process of the text feature extraction, thereby achieving the quantization of the text feature extraction model, which enables values of the quantized target quantization parameter to be evenly distributed, and effectively reduces accuracy loss in the process of restoring quantized numerical values to high-precision numerical values caused by the concentration of quantized numerical values near one numerical value. Thus, the accuracy of the text feature extraction model can be effectively improved while the improvement of the operating speed of the text feature extraction model is ensured.

In some embodiments, the step in which the quantization interval corresponding to the target quantization parameter is determined according to the target quantization parameter includes that distribution characteristics of numerical values of the target quantization parameter are determined; and the quantization interval corresponding to the target quantization parameter is determined based on the distribution characteristics of the numerical values. With this setting, the quantization interval can be dynamically determined based on the distribution characteristics of the numerical values of the target quantization parameter, and the accuracy of the text feature extraction model can be improved.

Exemplarily, all the floating-point values of the target quantization parameter may be analyzed, for example, a numerical value distribution diagram for the target quantization parameter is constructed based on all the floating-point values of the target quantization parameter, and the distribution characteristics of the numerical values of the target quantization parameter may be determined according to the numerical value distribution diagram. The distribution characteristics of the numerical values of the target quantization parameter may include that the numerical values of the target quantization parameter are concentratedly distributed in one numerical value or within an interval, or that the numerical values of the target quantization parameter are uniformly distributed, or that the numerical values of the target quantization parameter are normally distributed. The quantization interval corresponding to the target quantization parameter is determined based on the distribution characteristics of the numerical values of the target quantization parameter, for example, a quantization interval is determined according to the distribution characteristic of the numerical values of the target quantization parameter, to enable the most part (a preset ratio or preset number) of the numerical values of the target quantization parameter are within the quantization interval.

In some embodiments, before the quantization interval corresponding to the target quantization parameter is determined based on the distribution characteristics of the numerical values, the method further includes that a preset truncation ratio threshold is acquired; and the step in which the quantization interval corresponding to the target quantization parameter is determined based on the distribution characteristics of the numerical values includes that the quantization interval corresponding to the target quantization parameter is determined based on the preset truncation ratio threshold, an amount of data of the target quantization parameter, and the distribution characteristics of the numerical values of the target quantization parameter. Optionally, the step in which the quantization interval corresponding to the target quantization parameter is determined based on the preset truncation ratio threshold, the amount of the data of the target quantization parameter, and the distribution characteristics of the numerical values of the target quantization parameter includes that an amount 2N of truncated data is determined based on the preset truncation ratio threshold and the amount of the data of the target quantization parameter, where N is a product of the preset truncation ratio threshold and the amount of the data of the target quantization parameter; and the quantization interval corresponding to the target quantization parameter is determined based on an (N+1)-th smaller numerical value and an (N+1)-th larger numerical value of the target quantization parameter, where the quantization interval is [the (N+1)-th smaller numerical value, the (N+1)-th larger numerical value]. With such a setting, a better quantization interval can be determined accurately and quickly, which facilitates the improvement of the accuracy of the text feature extraction model.

The step in which the quantization interval corresponding to the target quantization parameter is determined based on the preset truncation ratio threshold, the amount of the data of the target quantization parameter, and the distribution characteristics of the numerical values of the target quantization parameter includes that an amount 2N of truncated data is determined based on the preset truncation ratio threshold and the amount of the data of the target quantization parameter, where N is a product of the preset truncation ratio threshold and the amount of the data of the target quantization parameter; and the quantization interval corresponding to the target quantization parameter is determined based on an (N+1)-th smaller numerical value and an (N+1)-th larger numerical value of the target quantization parameter, where the quantization interval is [the (N+1)-th mi smaller minimum numerical value, the (N+1)-th larger numerical value]. The (N+1)-th smaller numerical value is an (N+1)-th numerical value in a sorting result obtained by sorting floating-point values of the target quantization parameter in ascending order, and the (N+1)-th larger numerical value is an (N+1)-th numerical value in a sorting result obtained by sorting the floating-point values of the target quantization parameter in descending order.

Exemplarily, a preset truncation ratio threshold p is acquired, and an amount M of data of the target quantization parameter is determined, and the amount 2N of the truncated data is calculated according to the preset truncation ratio threshold p and the amount M of the data of the target quantization parameter, where N=M*p. The floating-point values of the target quantization parameter are sorted in an order from small to large or from large to small and truncated to exclude the minimum N floating-point values and the maximum N floating-point values of the target quantization parameter, and the quantization interval corresponding to the target quantization parameter is determined according to the (N+1)-th minimum numerical value and the (N+1)-th maximum numerical value, that is, the (N+1)-th minimum numerical value of the target quantization parameter is taken as a left end point of the quantization interval, and the (N+1)-th maximum numerical value of the target quantization parameter is taken as a right end point of the quantization interval, and the quantization interval is determined as [the (N+1)-th minimum numerical value, the (N+1)-th maximum numerical value]. For example, the preset truncation ratio threshold p=0.0001, and the amount of the data of the target quantization parameter is 100,000, then the whole range of the floating-point values is truncated to exclude the minimum 10 numerical values and the maximum 10 numerical values of the target quantization parameter, and the truncated range (that is, the quantization range) is determined as [the 11-th minimum floating value, the 11-th maximum floating value].

In some embodiments, the step in which the quantization interval corresponding to the target quantization parameter is determined according to the target quantization parameter includes that the type of the target quantization parameter is determined; and a preset interval corresponding to the type of the target quantization parameter is acquired, and the preset interval is determined as the quantization interval corresponding to the target quantization parameter. With this setting, the quantization interval can be quickly determined based on the type of the target quantization parameter, which facilitates the improvement of the accuracy of the text feature extraction model.

Exemplarily, the type of the target quantization parameter may include a network parameter and an intermediate operation result, and it may set, according to the type of the target quantization parameter, a corresponding quantization interval, where different types of target quantization parameters correspond to different quantization intervals. Optionally, when the target quantization parameter is a network parameter, the quantization interval corresponding to the target quantization parameter is [−0.5, 0.5], and when the target quantization parameter is an intermediate operation result, the quantization interval corresponding to the target quantization parameter is [−16.0, 16.0]. With such a setting, whether a network parameter is used as the target quantization parameter, or an intermediate operation result in the text feature extraction model is used as the target quantization parameter, the preset quantization interval can cover most of normal floating-point values, it can effectively avoid the situation that the floating-point values before the quantization and the integer values after the quantization are concentrated near one floating-point value and one integer value respectively, and can effectively improve the accuracy of the quantized text feature extraction model.

Figure 4:
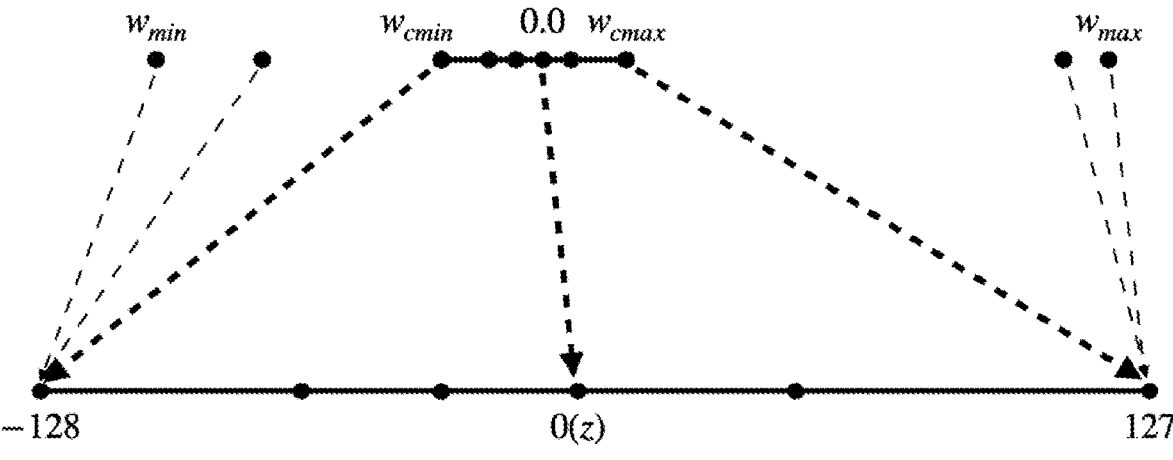
FIG. 4 is a diagram of the principle of symmetrical quantization for a text feature extraction model according to an embodiment of the present disclosure.

In some embodiments, before the mapping relationship between the floating-point values and the fixed-point values of the target quantization parameter is constructed based on the quantization interval, the method further includes that the quantization interval is adjusted to enable a fixed-point value corresponding to a floating-point value 0.0 after being quantized to be 0. If the integer value z (a fixed-point value z after the quantization) corresponding to the floating-point value 0.0 (the floating-point value 0.0 before the quantization) is not 0, it may cause a significant increase of amount of calculation for the quantization operation of the text feature extraction model, so, before the mapping relationship between the floating-point values and the fixed-point values of the target quantization parameter is constructed based on the quantization interval, the quantization interval may be adjusted to enable the fixed-point value corresponding to the floating-point number 0.0 after being quantized to be 0, even if the integer value corresponding to the floating-point number 0.0 after being quantized is still 0. With this setting, the text feature extraction model can be quantized symmetrically, and the efficiency of quantizing the text feature extraction model can be improved. Exemplarily, quantizing 32-bit floating-point number q into 8-bit integer number i is taken as an example, since the quantization interval is proportionally mapped, the length ratio of the interval $[w_{cmin}, 0]$ to the interval $[0, w_{cmax}]$ may be made equal to the length ratio of the interval [−128, 0] to the interval [0,127] in order that a symmetrical quantization may be performed on the text feature extraction model, in other words, $(0−w_{cmin})/(w_{cmax}−0)=128/127$, that is, $w_{cmin}=w_{cmax}*128/127$. Therefore, the quantization interval $[w_{cmin}, w_{cmax}]$ may be adjusted to [−bound*128/127,bound], where bound=max(abs($w_{cmin}$),abs($w_{cmax}$)) to ensure that the fixed-point value corresponding to the floating-point number 0.0 after being quantized is 0. FIG. 4 is a diagram of the principle of symmetrical quantization for a text feature extraction model according to an embodiment of the present disclosure.

In some embodiments, before the quantization interval corresponding to the target quantization parameter is determined according to the target quantization parameter, the method further includes that the target quantization parameter is determined according to a computation operation of a network layer of the text feature extraction model or the type of a network parameter of the text feature extraction model. With this setting, the target quantization parameter to be quantized in the text feature extraction model can be accurately determined, and the operation accuracy of the text feature extraction model can be effectively improved.

Optionally, the step in which the quantization parameter is determined according to the computation operation of the network layer of the text feature extraction model includes: in a case where the computation operation of the network layer of the text feature extraction model is a product operation, an input object used for the product operation is determined as the target quantization parameter; and in a case where the computation operation of the network layer of the text feature extraction model is a normalization operation, an output object of the normalization operation is determined as the target quantization parameter. Exemplarily, since when the computation operation of the network layer of the text feature extraction model is the product operation, a product between matrixes is generally involved, and the amount of calculation is relatively large; therefore, the input object for the product operation may be determined as the target quantization parameter. Since when the computation operation of the network layer of the text feature extraction model is the normalization operation, an output result of the normalization operation is generally transmitted to a Layer layer (that is, an L node), and the amount of calculation of the L node for the input object is relatively large; therefore, the output object of the normalization operation may be determined as the target quantization parameter.

Optionally, the type of the network parameter includes a weight matrix and a network bias; and the step in which the target quantization parameter is determined according to the type of the network parameter of the text feature extraction model includes that: in a case where the network parameter is the weight matrix of the text feature extraction model, the weight matrix is determined as the target quantization parameter. Exemplarily, since the weight matrix of the text feature extraction model is a matrix of over two dimensions which contains a large amount of data, while the network bias is generally data of one dimension, the weight matrix of the text feature extraction model can be determined as the target quantization parameter.

FIG. 5 is a flowchart of a quantization method for a text feature extraction model according to another embodiment of the present disclosure. As shown in FIG. 5, the method includes the following steps 510 to 570.

In step 510, in a training process of a text feature extraction model, a target quantization parameter is determined according to a computation operation of a network layer of the text feature extraction model or the type of a network parameter of the text feature extraction model, where the text feature extraction model is a Transformer model.

Optionally, the type of the network parameter includes a weight matrix and a network bias; the step in which the target quantization parameter is determined according to the type of the network parameter of the text feature extraction model includes that in a case where the network parameter is the weight matrix of the text feature extraction model, the weight matrix is determined as the target quantization parameter. Exemplarily, the amount of data occupied by the weight matrix Weight of the text feature extraction model is generally large; therefore, in the training process of the text feature extraction model, all the weight matrixes Weight in the text feature extraction model may be taken as the target quantization parameter, namely all weight matrixes Weight are quantized in the training process of the text feature extraction model. Optionally, the amount of data of the weight matrixes may further be determined, and a weight matrix with an amount of data greater than a preset threshold may be taken as a target quantization object, while a weight matrix with an amount of data smaller than the preset threshold is not quantized. The amount of data of the network bias of the text feature extraction model is generally small; therefore, it is not necessary to quantize the network bias in the text feature extraction model.

Optionally, the step in which the target quantization parameter is determined according to the computation operation of the network layer of the text feature extraction model includes that: in a case where the computation operation of the network layer of the text feature extraction model is a product operation, an input object used for the product operation are determined as a target quantization parameter; and in a case where the computation operation of the network layer of the text feature extraction model is a normalization operation, an output object of the normalization operation is determined as the target quantization parameter.

In an embodiment of the present disclosure, FIG. 6 is a structural diagram of a word vector input network of a text feature extraction model according to an embodiment of the present disclosure. As shown in FIG. 6, a word vector matrix We may be taken as the target quantization parameter, that is, the word vector matrix We is quantized and then input to a G node, where the G node represents performing a gather operation on the quantized word vector matrix We, that is, the word vectors of some specific words are taken from the quantized word vector matrix We, and then are spliced with a position vector $W_p$ to obtain the final output word vector. Since the position vector $W_p$ is obtained by performing sinusoidal calculation on input words, rather than being network parameters of the text feature extraction model, the position vector $W_p$ may not be quantized.

Figure 9:
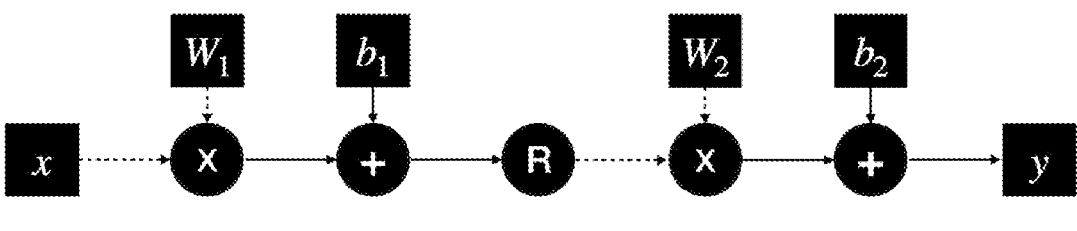
FIG. 9 is a structural diagram of a network of a feed-forward neural network layer in a text feature extraction model according to an embodiment of the present disclosure.
Figure 10:
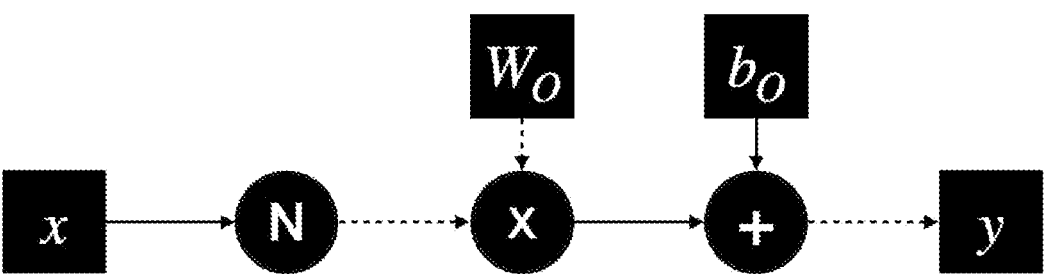
FIG. 10 is a structural diagram of a network of an output layer in a text feature extraction model according to an embodiment of the present disclosure.

In an embodiment of the present disclosure, the text feature extraction model is a Transformer model, where the Transformer model includes at least one attention layer and at least one feedforward neural network layer. FIG. 7 is a structural diagram of an overall network of a text feature extraction model according to an embodiment of the present disclosure. The L (layer) node in FIG. 7 represents an attention layer or a feedforward neural network layer, and the N (normalization) node represents a normalization operation, and when the computation operation of the network layer of the text feature extraction model is the normalization operation, the output object of the normalization operation may be determined as the target quantization parameter, that is, the quantization operation is performed on the output of the N node, and the output result after the quantization is input to the subsequent L node. Since network layers are end-to-end interconnected, the quantization of the output of each network layer is reflected in the quantization operation of the input of the next layer. Therefore, it is not necessary to quantize the output of each network layer. FIG. 8 is a structural diagram of a network of an attention layer in a text feature extraction model according to an embodiment of the present disclosure. As shown in FIG. 8, all the weight matrixes in the attention layer and the input objects used for the product operation in the attention layer may be determined as the target quantization parameters, that is, quantization is performed on all the weight matrixes in the attention layer and the input objects used for the product operation in the attention layer. After the output of the attention layer is input to the next network layer, the output of the N node in the next network layer may be quantized; therefore, the output of the attention layer may not be quantized. FIG. 9 is a structural diagram of a network of a feedforward neural network layer in a text feature extraction model according to an embodiment of the present disclosure. As shown in FIG. 9, all the weight matrixes in the feedforward neural network layer and the input objects used for the product operation in the feedforward neural network layer may be determined as the target quantization parameters, that is, quantization is performed on all the weight matrixes in the feedforward neural network layer and the input objects used for the product operation in the feedforward neural network layer. After the output of the feedforward neural network layer is input to the next network layer, the output of the N node in the next network layer may be quantized. Therefore, the output of the feedforward neural network layer may not be quantized. FIG. 10 is a structural diagram of a network of an output layer in a text feature extraction model according to an embodiment of the present disclosure. Input x in FIG. 10 is an output of a feedforward neural network. The final output of the feedforward neural network is not quantized, so a normalization operation (that is, inputting x to the N node in FIG. 10) may be performed on x after the output of the last layer of the entire Transformer encoder/decoder, and the output of the N node may be quantized. Since the softmax function needs to be delivered by the final output, and a relatively large amount of calculation operation is required, so that quantization operation may be performed on the final output.

Dotted arrows in FIG. 6 to FIG. 10 may indicate that the quantization operation is performed on the target quantization parameter.

In step 520, a preset truncation ratio threshold is acquired.

In step 530, an amount 2N of truncated data is determined based on the preset truncation ratio threshold and the amount of the data of the target quantization parameter, where N is a product of the preset truncation ratio threshold and the amount of the data of the target quantization parameter.

In step 540, the quantization interval corresponding to the target quantization parameter is determined based on an (N+1)-th minimum numerical value and an (N+1)-th maximum numerical value of the target quantization parameter, where the quantization interval is [the (N+1)-th minimum numerical value, the (N+1)-th maximum numerical value].

In step 550, the quantization interval is adjusted to enable a fixed-point value corresponding to a floating-point number 0.0 after being quantized to be 0.

In step 560, a mapping relationship between floating-point values and fixed-point values of the target quantization parameter is constructed based on the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value.

In step 570: a quantization operation is performed on the target quantization parameter based on the mapping relationship.

According to the technical solution of the embodiment of the present disclosure, the target quantization parameter may be determined according to the computation operation of the network layer of the text feature extraction model or the type of network parameter of the text feature extraction model, and the quantization interval corresponding to the target quantization parameter may be determined based on the preset truncation ratio threshold, the amount of the data of the target quantization parameter and the distribution characteristics of numerical values of the target quantization parameter, and the quantization interval is adjusted to enable the fixed-point value corresponding to the floating-point number 0.0 after being quantized to be 0, so as to construct the mapping relationship between the quantization parameters before and after the quantization based on the adjusted quantization interval, so as to quantize the target quantization parameter in the process of text feature extraction, which significantly improves the operating speed of the text feature extraction model while ensuring the accuracy of the text feature extraction model.

FIG. 11 is a flowchart of a quantization method for a text feature extraction model according to another embodiment of the present disclosure. As shown in FIG. 11, the method includes the following steps 1110, 1120, 1130, 1140 and 1150.

In step 1110, in a training process of a text feature extraction model, a target quantization parameter is determined according to a computation operation of a network layer of the text feature extraction model or the type of a network parameter, where the text feature extraction model is a Transformer model.

Optionally, the step in which the target quantization parameter is determined according to the computation operation of the network layer of the text feature extraction model includes that: in a case where the computation operation of the network layer of the text feature extraction model is a product operation, an input object used for the product operation is determined as the target quantization parameter; and in a case where the computation operation of the network layer of the text feature extraction model is a normalization operation, an output object of the normalization operation is determined as the target quantization parameter.

Optionally, the type of the network parameter includes a weight matrix and a network bias; and the step in which the target quantization parameter is determined according to the type of the network parameter of the text feature extraction model includes that in a case where the network parameter is the weight matrix of the text feature extraction model, the weight matrix is determined as the target quantization parameter.

In step 1120, the type of the target quantization parameter is determined.

In step 1130, a preset interval corresponding to the type of the target quantization parameter is acquired, and the preset interval is determined as the quantization interval corresponding to the target quantization parameter.

Exemplarily, the type of the target quantization parameter may include a network parameter and an intermediate operation result, and when the target quantization parameter is the network parameter, the quantization interval corresponding to the target quantization parameter is [−0.5, 0.5], and when the target quantization parameter is the intermediate operation result, the quantization interval corresponding to the target quantization parameter is [−111.0, 111.0].

In step 1140, a mapping relationship between floating-point values and fixed-point values of the target quantization parameter is constructed based on the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value.

In step 1150, a quantization operation is performed on the target quantization parameter based on the mapping relationship.

In the technical solution according to the embodiments of the present disclosure, whether the network parameter is used as the target quantization parameter, or the intermediate operation result in the text feature extraction model is used as the target quantization parameter, the preset quantization interval can cover most of the normal floating-point values, which can effectively avoid the situation that the floating-point values before the quantization and the integer values after the quantization are concentrated near one numerical value respectively, and can effectively improve the accuracy of the quantized text feature extraction model.

Figure 12:
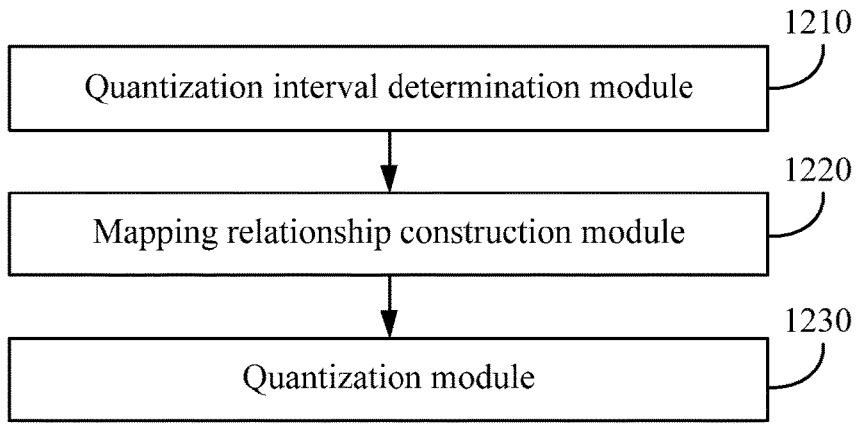
FIG. 12 is a structural diagram of a quantization apparatus for a text feature extraction model according to another embodiment of the present disclosure.

FIG. 12 is a structural diagram of a quantization apparatus for a text feature extraction model according to another embodiment of the present disclosure. As shown in FIG. 12, the apparatus includes a quantization interval determination module 1210, a mapping relationship construction module 1220 and a quantization module 1230.

The quantization interval determination module 1210 is configured to determine, according to a target quantization parameter, a quantization interval corresponding to the target quantization parameter in a training process of a text feature extraction model, where the quantization interval includes a part of floating-point values of the target quantization parameter.

The mapping relationship construction module 1220 is configured to construct a mapping relationship between floating-point values and fixed-point values of the target quantization parameter based on the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value.

The quantization module 1230 is configured to perform a quantization operation on the target quantization parameter based on the mapping relationship.

In the embodiment of the present disclosure, in a training process of a text feature extraction model, a quantization interval corresponding to a target quantization parameter is determined according to the target quantization parameter, where the quantization interval includes a part of floating-point values of the target quantization parameter; a mapping relationship between floating-point values and fixed-point values of the target quantization parameter is constructed based on the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value; and a quantization operation is performed on the target quantization parameter based on the mapping relationship. The quantization apparatus for a text feature extraction model according to the embodiment of the present disclosure can adaptively and dynamically select the quantization interval according to the numerical value distribution of the target quantization parameter, so as to construct the mapping relationship between the quantization parameters before and after the quantization based on the quantization interval, so as to quantize the target quantization parameter in the process of the text feature extraction, thereby achieving the quantization of the text feature extraction model, which enables values of the quantized target quantization parameter to be evenly distributed, and effectively reduces the accuracy loss in the process of restoring quantized numerical values to high-precision numerical values caused by concentration of quantized numerical values near one numerical value, which can effectively improve accuracy of the text feature extraction model while ensuring improvement of operating speed of the text feature extraction model.

Optionally, the quantization interval determination module 1210 includes a distribution characteristic determining unit, and a quantization interval determination unit.

The distribution characteristic determining unit is configured to determine distribution characteristics of numerical values of the target quantization parameter.

The quantization interval determination unit is configured to determine the quantization interval corresponding to the target quantization parameter based on the distribution characteristics of numerical values of the target quantization parameter.

Optionally, the apparatus further includes a truncation ratio acquisition module.

The truncation ratio acquisition module is configured to acquire a preset truncation ratio threshold before the quantization interval corresponding to the target quantization parameter is determined based on the distribution characteristics of the numerical values.

The quantization interval determination unit includes a quantization interval determination subunit.

The quantization interval determination subunit is configured to determine the quantization interval corresponding to the target quantization parameter based on the preset truncation ratio threshold, an amount of data of the target quantization parameter, and the distribution characteristics of the numerical values of the target quantization parameter.

Optionally, the quantization interval determination subunit is configured to determine an amount 2N of truncated data based on the preset truncation ratio threshold and the amount of the data of the target quantization parameter, where N is a product of the preset truncation ratio threshold and the amount of the data of the target quantization parameter; and determine, based on an (N+1)-th minimum numerical value and an (N+1)-th maximum numerical value of the target quantization parameter, the quantization interval corresponding to the target quantization parameter, where the quantization interval is [the (N+1)-th minimum numerical value, the (N+1)-th maximum numerical value].

The quantization interval determination module 1210 is configured to: determine the type of the target quantization parameter; and acquire a preset interval corresponding to the type of the target quantization parameter, and determine the preset interval as the quantization interval corresponding to the target quantization parameter.

Optionally, the apparatus further includes an interval adjustment module.

The interval adjustment module is configured to, before the mapping relationship between the floating-point values and fixed-point values of the target quantization parameter is constructed based on the quantization interval, adjust the quantization interval to enable a fixed-point value corresponding to a floating-point value 0.0 after being quantized to be 0.

Optionally, the apparatus further includes a target quantization parameter determination module.

The target quantization parameter determination module is configured to, before the quantization interval corresponding to the target quantization parameter is determined according to the target quantization parameter, determine the target quantization parameter according to a computation operation of a network layer of the text feature extraction model or the type of a network parameter of the text feature extraction model.

Optionally, the target quantization parameter determination module is configured to: in a case where the computation operation of the network layer of the text feature extraction model is a product operation, determine an input object used for the product operation as the target quantization parameter; and in a case where the computation operation of the network layer of the text feature extraction model is a normalization operation, determine an output object of the normalization operation as the target quantization parameter.

Optionally, the type of the network parameter includes a weight matrix and a network bias.

The target quantization parameter determination module is configured to: in a case where the network parameter is the weight matrix of the text feature extraction model, determine the weight matrix as the target quantization parameter.

The above-described apparatus can execute the methods provided by all the foregoing embodiments of the present disclosure, and has corresponding functional modules for executing the above-described methods and can achieve corresponding beneficial effects. For technical details not exhaustively described in the embodiments of the present disclosure, reference may be made to the methods provided in all the foregoing embodiments of the present disclosure.

Figure 13:
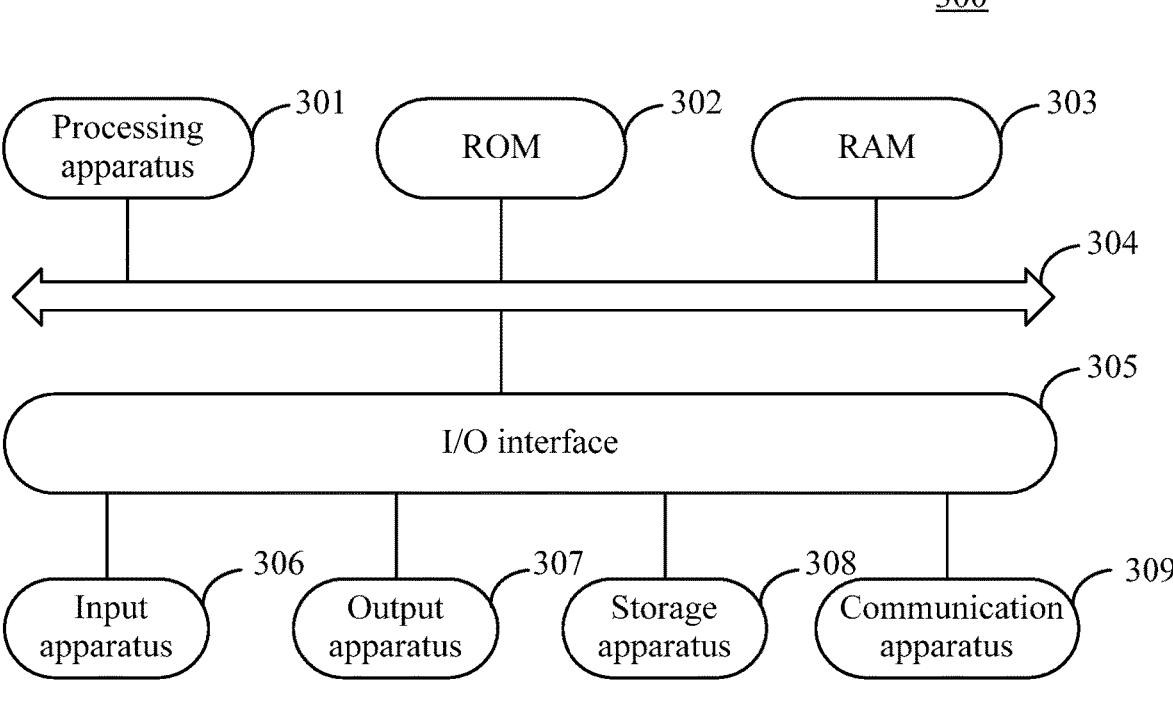
FIG. 13 is a structural diagram of an electronic device according to another embodiment of the present disclosure.

Referring now to FIG. 13, FIG. 13 shows a schematic structural diagram of an electronic device 300 applicable to implementing the embodiments of the present disclosure. The electronic device in the embodiments of the present disclosure may include, but is not limited to, a mobile terminal such as a mobile phone, a laptop, a digital broadcast receiver, a personal digital assistant (PDA), a portable Android device (PAD), a portable multimedia player (PMP), and a vehicle-mounted terminal (such as a vehicle-mounted navigation terminal) and a fixed terminal such as a digital television (TV) and a desktop computer or various forms of servers, such as independent servers or server clusters. The electronic device shown in FIG. 13 is merely an example and should not be construed as limiting the functionality and scope of use of the embodiments of the present disclosure.

As shown in FIG. 13, the electronic device 300 may include a processing apparatus 301 (e.g., a central processing unit, a graphics processing unit, or the like), which may perform various appropriate actions and processes according to a program stored in a read-only memory (ROM) 302 or a program loaded from a storage apparatus 305 into a random access memory (RAM) 303. In RAM 303, various programs and data required by the electronic device 300 for operation are also stored. The processing apparatuses 301, ROM 302 and RAM 303 are connected to each other via a bus 304. An input/output (I/O) interface 305 is also connected to the bus 304.

Generally, the following apparatuses may be connected to the I/O interface 305: an input apparatus 306 including, for example, a touch screen, a touch pad, a keyboard, a mouse, a camera, a microphone, an accelerometer, a gyroscope, and the like; an output apparatus 307 including, for example, a liquid crystal display (LCD), a speaker, a vibrator, and the like; a storage apparatus 308 including, for example, a magnetic tape, a hard disk, and the like; and a communication apparatus 309. The communication apparatus 309 may allow the electronic device 300 to perform wireless or wired communicate with other devices to exchange data. Although FIG. 13 shows an electronic device 300 having various apparatuses, it should be understood that it is not required to have all of the apparatuses shown. Alternatively, more or fewer apparatuses may be implemented or presented.

Particularly, according to the embodiment of the present disclosure, the process described above with reference to the flowchart may be implemented as a computer software program. For example, the embodiments of the present disclosure include a computer program product. The computer program product includes a computer program carried in a computer- readable medium. The computer program includes program codes for performing a quantization method for a text feature extraction model. In such an embodiment, the computer program may be downloaded and installed from the network through the communication device 309, or installed from the storage apparatus 308, or installed from the ROM 302. When the computer program is executed by the processing apparatus 301, the above functions defined in the method of the disclosed embodiment are performed.

It is to be noted that the preceding computer-readable medium in the present disclosure may be a computer-readable signal medium or a computer-readable storage medium or any combination thereof. The computer-readable storage medium, for example, may be, but is not limited to, an electronic, magnetic, optical, electromagnetic, infrared or semiconductor system, apparatus or device or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof. The storage medium may be a non-transitory storage medium.

In the present disclosure, the computer-readable storage medium may be any tangible medium including or storing a program. The program may be used by or used in conjunction with an instruction execution system, apparatus, or device. In the present disclosure, the computer-readable signal medium may include a data signal on a baseband or propagated as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate by using any currently known or future-developed network protocols, such as the hyper text transfer protocol (HTTP), and may be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any currently known or future developed network.

The computer-readable medium may be included in the electronic device or may exist alone without being assembled into the electronic device.

The computer readable medium carries one or more programs that, when executed by the electronic device, cause the electronic device to: determine, according to a target quantization parameter, a quantization interval corresponding to the target quantization parameter in a training process of a text feature extraction model, where the quantization interval includes a part of floating-point values of the target quantization parameter; construct a mapping relationship between floating-point values and fixed-point values of the target quantization parameter based on the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value; and perform a quantization operation on the target quantization parameter based on the mapping relationship.

Computer program codes for performing the operations in the present disclosure may be written in one or more programming languages or a combination thereof. The preceding one or more programming languages include, but are not limited to, object-oriented programming languages such as Java, Smalltalk and C++, as well as conventional procedural programming languages such as "C" language or similar programming languages. Program codes may be executed entirely on a user computer, partly on a user computer, as a stand-alone software package, partly on a user computer and partly on a remote computer, or entirely on a remote computer or a server. In the case relate to the remote computer, the remote computer may be connected to the user computer via any kind of network including a local area network (LAN) or a wide area network (WAN), or may be connected to an external computer (for example, via the internet through an internet service provider).

The flowcharts and block diagrams in the drawings show the possibly implemented architecture, function and operation of the system, method and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. In some cases, the name of the unit does not constitute a limitation on the unit itself.

The functions described above herein may be executed, at least partially, by one or more hardware logic components. For example, and without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any appropriate combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical storage device, a magnetic storage device, or any appropriate combination thereof.

According to one or more embodiments of the present disclosure, a quantization method for a text feature extraction model is provided and includes the steps described below.

In a training process of a text feature extraction model, a quantization interval corresponding to a target quantization parameter is determined according to the target quantization parameter, where the quantization interval includes a part of floating-point values of the target quantization parameter.

A mapping relationship between floating-point values and fixed-point values of the target quantization parameter is constructed based on the quantization interval, where a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value.

A quantization operation is performed on the target quantization parameter based on the mapping relationship.

The step in which the quantization interval corresponding to the target quantization parameter is determined according to the target quantization parameter includes the steps described below.

Distribution characteristics of numerical values of the target quantization parameter are determined.

The quantization interval corresponding to the target quantization parameter is determined based on the distribution characteristics of the numerical values of the target quantization parameter.

Before the quantization interval corresponding to the target quantization parameter is determined based on the distribution characteristics of numerical values of the target quantization parameter, the method further includes the step described below.

A preset truncation ratio threshold is acquired.

The step in which the quantization interval corresponding to the target quantization parameter is determined based on the distribution characteristics of the numerical values of the target quantization parameter includes the step described below.

The quantization interval corresponding to the target quantization parameter is determined based on the preset truncation ratio threshold, an amount of data of the target quantization parameter, and the distribution characteristics of the numerical values of the target quantization parameter.

The step in which the quantization interval corresponding to the target quantization parameter is determined based on the preset truncation ratio threshold, the amount of the data of the target quantization parameter, and the distribution characteristics of the numerical values of the target quantization parameter, includes the steps described below.

An amount 2N of truncated data is determined based on the preset truncation ratio threshold and the amount of the data of the target quantization parameter, where N is a product of the preset truncation ratio threshold and the amount of the data of the target quantization parameter.

The quantization interval corresponding to the target quantization parameter is determined based on an (N+1)-th minimum numerical value and an (N+1)-th maximum numerical value of the target quantization parameter, where the quantization interval is [the (N+1)-th minimum numerical value, the (N+1)-th maximum numerical value].

The step in which the quantization interval corresponding to the target quantization parameter is determined according to the target quantization parameter includes the steps described below.

The type of the target quantization parameter is determined.

A preset interval corresponding to the type of the target quantization parameter is acquired, and the preset interval is determined as the quantization interval corresponding to the target quantization parameter.

Before the mapping relationship between the floating-point values and fixed-point values of the target quantization parameter is constructed based on the quantization interval, the method further includes the steps described below.

The quantization interval is adjusted to enable a fixed-point value corresponding to a floating-point value 0.0 after being quantized to be 0.

Before the quantization interval corresponding to the target quantization parameter is determined according to the target quantization parameter, the method further includes the step described below.

The target quantization parameter is determined according to a computation operation of a network layer of the text feature extraction model or the type of a network parameter of the text feature extraction model.

The step in which the target quantization parameter is determined according to the computation operation of the network layer of the text feature extraction model includes the steps described below.

In a case where the computation operation of the network layer of the text feature extraction model is a product operation, an input object used for the product operation is determined as the target quantization parameter.

In a case where the computation operation of the network layer of the text feature extraction model is a normalization operation, an output object of the normalization operation is determined as the target quantization parameter.

The type of the network parameters includes a weight matrix and a network bias.

The step in which the target quantization parameter is determined according to the type of network parameters of the text feature extraction model includes the step described below.

In a case where the network parameter is the weight matrix of the text feature extraction model, the weight matrix is determined as the target quantization parameter.

What is claimed is:

1. A quantization method for a text feature extraction model, performed by a processor of a device with a function of quantization for the text feature extraction model, the device comprises a server, a mobile terminal, or a server cluster, and the text feature extraction model is a machine learning model applied to natural language processing, wherein the method comprises:

in a training process of the text feature extraction model, determining, according to a target quantization parameter, a quantization interval corresponding to the target quantization parameter; wherein the quantization interval is an interval obtained by taking a part of floating-point values of the target quantization parameter, the part of the floating-point values of the target quantization parameter is within the quantization interval, and another part of the floating-point values of the target quantization parameter is outside the quantization interval; and wherein the target quantization parameter refers to a target parameter to be quantized in the training process of the text feature extraction model;

constructing a mapping relationship between floating-point values of the target quantization parameter that lie within the quantization interval and fixed-point values of the target quantization parameter, wherein a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value; and performing a quantization operation on the target quantization parameter based on the mapping relationship; wherein in each time of iterative training of the text feature extraction model, a quantization parameter for constructing the mapping relationship between the floating-point values of the target quantization parameter and the fixed-point values of the target quantization parameter is determined once, and the quantization operation is completed through multiple times of the iterative training of the quantization for the text feature extraction model; wherein the determination of the quantization parameter is performed by the processor of the device, and the processor performs a program stored in a memory of the device to complete the determination; and wherein the mapping relationship between the floating-point values of the target quantization parameter and the fixed-point values of the target quantization parameter is constructed through an algorithm $i=q/s+z$, where i represents a fixed-point integer, s represents the quantization parameter, z represents an integer value corresponding to a floating-point number q after being quantized, and the floating-point number q is located within the quantization interval;

wherein determining, according to the target quantization parameter, the quantization interval corresponding to the target quantization parameter comprises:

determining an amount $2N$ of truncated data based on a preset truncation ratio threshold and an amount of the data of the target quantization parameter, wherein N is a product of the preset truncation ratio threshold and the amount of the data of the target quantization parameter; and determining, based on an (N+1)-th smaller numerical value of the target quantization parameter and an (N+1)-th larger numerical value of the target quantization parameter, the quantization interval corresponding to the target quantization parameter, wherein the quantization interval ranges from the (N+1)-th smaller numerical value to the (N+1)-th larger numerical value, the (N+1)-th smaller numerical value is an (N+1)-th numerical value in a sorting result obtained by sorting the floating-point values of the target quantization parameter in an ascending order, and the (N+1)-th larger numerical value is an (N+1)-th numerical value in a sorting result obtained by sorting the floating-point values of the target quantization parameter in a descending order; and wherein the quantization interval is $[w_{min}, w_{max}]$ and the method further comprises: before constructing the mapping relationship, adjusting the quantization interval $[w_{min}, w_{max}]$ to $[-bound*128/127, bound]$, where $bound=max(abs(w_{cmin}), abs(w_{cmax}))$, wherein in each time of iterative training of the text feature extraction model, the quantization parameter is determined once until an accuracy loss of the text feature extraction model reaches a minimum, or even 0.

2. The method according to claim 1, wherein determining, according to the target quantization parameter, the quantization interval corresponding to the target quantization parameter comprises:

determining distribution characteristics of numerical values of the target quantization parameter; and determining, based on the distribution characteristics of the numerical values, the quantization interval corresponding to the target quantization parameter.

3. The method according to claim 2, before determining, based on the distribution characteristics of the numerical values, the quantization interval corresponding to the target quantization parameter, further comprising:

acquiring the preset truncation ratio threshold.

4. The method according to claim 1, wherein adjusting the quantization interval comprises:

adjusting the quantization interval to enable a fixed-point value corresponding to a floating-point value 0.0 after being quantized to be 0.

5. The method according to claim 1, before determining, according to the target quantization parameter, the quantization interval corresponding to the target quantization parameter, further comprising:

determining the target quantization parameter according to a computation operation of a network layer of the text feature extraction model or a type of a network parameter of the text feature extraction model.

6. The method according to claim 5, wherein determining the target quantization parameter according to the computation operation of the network layer of the text feature extraction model comprises:

in a case where the computation operation of the network layer of the text feature extraction model is a product operation, determining an input object used for the product operation as the target quantization parameter; and in a case where the computation operation of the network layer of the text feature extraction model is a normalization operation, determining an output object of the normalization operation as the target quantization parameter.

7. The method according to claim 5, wherein the type of the network parameter comprises a weight matrix and a network bias; and wherein determining the target quantization parameter according to the type of the network parameter of the text feature extraction model comprises:

in a case where the network parameter is the weight matrix of the text feature extraction model, determining the weight matrix as the target quantization parameter.

8. An electronic device, wherein the electronic device is a device with a function of quantization for a text feature extraction model, the device comprises a server, a mobile terminal, or a server cluster, and the text feature extraction model is a machine learning model applied to natural language processing, wherein the electronic device comprises:

at least one processing apparatus;

a storage apparatus, configured to store at least one program;

wherein the at least one program, when executed by the at least one processing apparatus, causes the at least one processing apparatus-to implement:

in a training process of the text feature extraction model, determining, according to a target quantization parameter, a quantization interval corresponding to the target quantization parameter; wherein the quantization interval is an interval obtained by taking a part of floating-point values of the target quantization parameter, the part of the floating-point values of the target quantization parameter is within the quantization interval, and another part of the floating-point values of the target quantization parameter is outside the quantization interval; and wherein the target quantization parameter refers to a target parameter to be quantized in the training process of the text feature extraction model;

constructing a mapping relationship between floating-point values of the target quantization parameter that lie within the quantization interval and fixed-point values of the target quantization parameter, wherein a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value; and performing a quantization operation on the target quantization parameter based on the mapping relationship;

wherein in each time of iterative training of the text feature extraction model, a quantization parameter for constructing the mapping relationship between the floating-point values of the target quantization parameter and the fixed-point values of the target quantization parameter is determined once, and the quantization operation is completed through multiple times of the iterative training of the quantization for the text feature extraction model; wherein the determination of the quantization parameter is performed by the at least one processing apparatus of the device, and the at least one processing apparatus performs the at least one program stored in the storage apparatus of the device to complete the determination; and wherein the mapping relationship between the floating-point values of the target quantization parameter and the fixed-point values of the target quantization parameter is constructed through an algorithm $i=q/s+z$, where i represents a fixed-point integer, s represents the quantization parameter, z represents an integer value corresponding to a floating-point number q after being quantized, and the floating-point number q is located within the quantization interval;

wherein determining, according to the target quantization parameter, the quantization interval corresponding to the target quantization parameter comprises:

determining an amount 2N of truncated data based on a preset truncation ratio threshold and an amount of the data of the target quantization parameter, wherein N is a product of the preset truncation ratio threshold and the amount of the data of the target quantization parameter; and determining, based on an (N+1)-th smaller numerical value of the target quantization parameter and an (N+1)-th larger numerical value of the target quantization parameter, the quantization interval corresponding to the target quantization parameter, wherein the quantization interval ranges from the (N+1)-th smaller numerical value to the (N+1)-th larger numerical value, the (N+1)-th smaller numerical value is an (N+1)-th numerical value in a sorting result obtained by sorting the floating-point values of the target quantization parameter in an ascending order, and the (N+1)-th larger numerical value is an (N+1)-th numerical value in a sorting result obtained by sorting the floating-point values of the target quantization parameter in a descending order; and wherein the quantization interval is $[W_{cmin}, W_{cmax}]$, and the at least one processing apparatus is further configured to: adjust the quantization interval $[w_{cmin}, w_{cmax}]$ to $[-bound*128/127, bound]$, where $bound=\max(abs(w_{cmin}), abs(w_{cmax}))$, wherein in each time of iterative training of the text feature extraction model, the quantization parameter is determined once until an accuracy loss of the text feature extraction model reaches a minimum, or even 0.

9. The electronic device of claim 8, wherein the at least one program, when executed by the at least one processing apparatus, causes the at least one processing apparatus to implement determining, according to the target quantization parameter, the quantization interval corresponding to the target quantization parameter in the following way:

determining distribution characteristics of numerical values of the target quantization parameter; and determining, based on the distribution characteristics of the numerical values, the quantization interval corresponding to the target quantization parameter.

10. The electronic device of claim 9, wherein the at least one program, when executed by the at least one processing apparatus, causes the at least one processing apparatus to, before implementing determining, based on the distribution characteristics of the numerical values, the quantization interval corresponding to the target quantization parameter, further implement:

acquiring the preset truncation ratio threshold.

11. The electronic device of claim 8, wherein the at least one program, when executed by the at least one processing apparatus, causes the at least one processing apparatus to, implement adjusting the quantization interval in the following way:

adjusting the quantization interval to enable a fixed-point value corresponding to a floating-point value 0.0 after being quantized to be 0.

12. The electronic device of claim 8, wherein the at least one program, when executed by the at least one processing apparatus, causes the at least one processing apparatus to, before implementing determining, according to the target quantization parameter, the quantization interval corresponding to the target quantization parameter, further implement:

determining the target quantization parameter according to a computation operation of a network layer of the text feature extraction model or a type of a network parameter of the text feature extraction model.

13. The electronic device of claim 12, wherein the at least one program, when executed by the at least one processing apparatus, causes the at least one processing apparatus to implement determining the target quantization parameter according to the computation operation of the network layer of the text feature extraction model in the following way:

in a case where the computation operation of the network layer of the text feature extraction model is a product operation, determining an input object used for the product operation as the target quantization parameter; and in a case where the computation operation of the network layer of the text feature extraction model is a normalization operation, determining an output object of the normalization operation as the target quantization parameter.

14. The electronic device of claim 12, wherein the type of the network parameter comprises a weight matrix and a network bias; and wherein the at least one program, when executed by the at least one processing apparatus, causes the at least one processing apparatus to implement determining the target quantization parameter according to the type of the network parameter of the text feature extraction model in the following way:

in a case where the network parameter is the weight matrix of the text feature extraction model, determining the weight matrix as the target quantization parameter.

15. A non-transitory computer-readable medium storing a computer program, wherein the computer program, when executed by a processor, implement a quantization method for a text feature extraction model, the quantization method being performed by the processor of a device with a function of quantization for the text feature extraction model, the device comprises a server, a mobile terminal, or a server cluster, and the text feature extraction model is a machine learning model applied to natural language processing, wherein the quantization method comprises:

in a training process of the text feature extraction model, determining, according to a target quantization parameter, a quantization interval corresponding to the target quantization parameter; wherein the quantization interval is an interval obtained by taking a part of floating-point values of the target quantization parameter, the part of the floating-point values of the target quantization parameter is within the quantization interval, and another part of the floating-point values of the target quantization parameter is outside the quantization interval; and wherein the target quantization parameter refers to a target parameter to be quantized in the training process of the text feature extraction model;

constructing a mapping relationship between floating-point values of the target quantization parameter that lie within the quantization interval and fixed-point values of the target quantization parameter, wherein a floating-point value, smaller than a left end point of the quantization interval, of the target quantization parameter is mapped to a quantized minimum fixed-point value, and a floating-point value, larger than a right end point of the quantization interval, of the target quantization parameter is mapped to a quantized maximum fixed-point value; and performing a quantization operation on the target quantization parameter based on the mapping relationship; wherein in each time of iterative training of the text feature extraction model, a quantization parameter for constructing the mapping relationship between the floating-point values of the target quantization parameter and the fixed-point values of the target quantization parameter is determined once, and the quantization operation is completed through multiple times of the iterative training of the quantization for the text feature extraction model; wherein the determination of the quantization parameter is performed by the processor of the device, and the processor performs the computer program stored in the non-transitory computer-readable medium to complete the determination;

and wherein the mapping relationship between the floating-point values of the target quantization parameter and the fixed-point values of the target quantization parameter is constructed through an algorithm $i=q/s+z$, where i represents a fixed-point integer, s represents the quantization parameter, z represents an integer value corresponding to a floating-point number q after being quantized, and the floating-point number q is located within the quantization interval;

wherein determining, according to the target quantization parameter, the quantization interval corresponding to the target quantization parameter comprises:

determining an amount $2N$ of truncated data based on a preset truncation ratio threshold and an amount of the data of the target quantization parameter, wherein N is a product of the preset truncation ratio threshold and the amount of the data of the target quantization parameter; and determining, based on an (N+1)-th smaller numerical value of the target quantization parameter and an (N+1)-th larger numerical value of the target quantization parameter, the quantization interval corresponding to the target quantization parameter, wherein the quantization interval ranges from the (N+1)-th smaller numerical value to the (N+1)-th larger numerical value, the (N+1)-th smaller numerical value is an (N+1)-th numerical value in a sorting result obtained by sorting the floating-point values of the target quantization parameter in an ascending order, and the (N+1)-th larger numerical value is an (N+1)-th numerical value in a sorting result obtained by sorting the floating-point values of the target quantization parameter in a descending order; and wherein the quantization interval is $[w_{cmin}, w_{cmax}]$, and the method further comprises: before constructing the mapping relationship, adjusting the quantization interval $[w_{cmin}, w_{cmax}]$ to $[-\text{bound}*128/127, \text{bound}]$, where $\text{bound}=\max(\text{abs}(W_{cmin}), \text{abs}(w_{cmax}))$, wherein in each time of iterative training of the text feature extraction model, the quantization parameter is determined once until an accuracy loss of the text feature extraction model reaches a minimum, or even 0.

16. The non-transitory computer-readable medium of claim 15, wherein the computer program, when executed by the processing apparatus, implement determining, according to the target quantization parameter, the quantization interval corresponding to the target quantization parameter in the following way:

determining distribution characteristics of numerical values of the target quantization parameter; and determining, based on the distribution characteristics of the numerical values, the quantization interval corresponding to the target quantization parameter.

* * * * *